United States Patent

Spaulding et al.

Patent Number: 5,078,513
Date of Patent: Jan. 7, 1992

[54] ACHROMATIC WAVEGUIDE LENSES

[75] Inventors: Kevin Spaulding, Spencerport; G. Michael Morris, Fairport, both of N.Y.

[73] Assignee: The University of Rochester, Rochester, N.Y.

[21] Appl. No.: 610,778

[22] Filed: Nov. 8, 1990

[51] Int. Cl.$^5$ .............................................. G02B 6/10
[52] U.S. Cl. ...................................... 385/14; 385/129
[58] Field of Search ............... 350/96.12, 96.10, 96.11, 350/96.19, 452, 413, 162.16, 3.72

[56] References Cited

U.S. PATENT DOCUMENTS

| 4,729,641 | 3/1988 | Matsuoka et al. | 350/96.19 X |
| 4,958,896 | 9/1990 | Brinkmeyer et al. | 350/96.12 X |
| 4,993,799 | 2/1991 | Stein | 350/96.18 |
| 5,007,698 | 4/1991 | Sasaki et al. | 350/96.12 X |

OTHER PUBLICATIONS

R. Ulrich, R. J. Martin, "Geometrical Optics in Thin Film Light Guides", Applied Optics, vol. 10, No. 9, Sep. 1971, pp. 2077, 2083.
A. I. Tudorouskii, "An Objective with a Phase Plate", Optics & Spectroscopy, vol. 6, No. 2, Feb. 1959, p. 126.
K. Miyamoto, "The Phase Fresnel Lens", Journal of the Optical Society of America, vol. 51, No. 1, Jan. 1961, p. 17.
H. Madjidi-Zolbanine, C. Froehly, "Holographic Correction of Both Chromatic & Spherical Aberrations of Single Glass Lenses", Applied Optics, vo. 18, #14, Jul. 15, 1979, p. 2385.
G. M. Morris, "Diffraction Theory for an Achromatic Fourier Transformation", Applied Optics, vol. 20, p. 2017, Jun. 1, 1981.
P. Stone, N. George, "Hybrid Diffractive-Refractive Lenses & Achromats", Applied Optics, vol. 27, #14, Jul. 15, 1988, p. 2960.
D. A. Buralli, G. M. Morris, "Optical Performance of Holographic Kinoforms", Applied Optics, vol. 28, #5, Mar. 1, 1989, p. 976.
D. Buralli, G. M. Morris, "Design of a Wide Field Diffractive Landscape Lens", Applied Optics, vol. 28, No. 18, Sep. 15, 1989, p. 3950.
H. Nishihara, M. Haruna, T. Suhara, "Optical Integrated Circuits", Chapter 2, Chapter 9, McGraw-Hill Book Co., 1989.

Primary Examiner—Frank Gonzalez
Assistant Examiner—Phan T. Heartney
Attorney, Agent, or Firm—Martin Lukacher

[57] ABSTRACT

A lens in a waveguide of an integrated optical circuit is achromatized (corrected for chromatic dispersion which varies the focal length of the lens with wavelength) by forming the lens as a hybrid mode-index/diffractive doublet. The chromatic dispersion of the diffractive element cancels the dispersion of the refractive element (the mode-index lens) such that the derivative of the focal length goes to zero at the design wavelength, and significantly reduces chromatic dispersion over a substantial wavelength range. For example, a 10 mm focal length, F/5 hybrid mode-index/diffractive lens may be provided with a useable wavelength range of approximately 80 mm for typical waveguide materials.

10 Claims, 4 Drawing Sheets

ACHROMATIC WAVEGUIDE LENSES

DESCRIPTION

The present invention relates to achromatic waveguide lenses and methods of making same and particularly to an achromatic waveguide lens which is made by forming a hybrid mode-index/diffractive lens system.

The present invention is especially suitable for use in integrated optical circuits and is applicable for improving the performance of such circuits, and the performance of other integrated optical devices, to correct for variations in wavelength of the light source which drives or is generated in these circuits and devices. It is more desirable to achromatize a device (whether stand alone or used in an integrated circuit), than to provide a light source which provides precisely controlled wavelength, since miniature light sources suitable for use in integrated optics and with constant wavelength light output, are presently very expensive. The use of broadband and tunable light sources is also facilitated by the invention.

In integrated optical devices, particularly waveguide lenses, the refractive properties of the lens depend upon the effective mode-index, which is also known as the refractive index of the propagating waveguide mode. The mode-index and its derivation is discussed in the text "Optical Integrated Circuits" by H. Nishihara, M. Haruna, and T. Suhara, McGraw Hill Book Company, 1989, see particularly Chapter 2 and Section 2.4.3 for step-index type waveguides. The effective mode-index is a strong function (highly dependent) of the wavelength of the light propagating along the guide. FIG. 2 shows for example the effective mode-index for the TE0 mode as a function of wavelength for varying, thicknesses, of a step-index Corning #7059 waveguide on an oxidized silicon substrate. For a waveguide lens, there are two effective mode indices, namely the index $N_L$ of the lens region and the index $N_B$ of the surrounding region. $N_B$ is also known as the background mode-index. The thickness of the layers, as well as the index of refraction of the various materials, changes the mode-index. It has been noted that an achromatic mode-index lens can be made by choosing an appropriate pair of mode-indices, so that the lens will be achromatic in a wavelength interval around the design wavelength covering a few nm. See R. Ulrich and R. J. Martin, "Geometrical Optics in Thin Film Light Guides," Applied Optics, Volume 10, No. 9, September 1971, page 2077, 2083.

Because of the strong dependence on wavelength of the effective mode-index of the waveguide, it is not predictable, nor has it been thought feasible, that techniques used to achromatize lenses in bulk optics, where the index of the bulk lens is not strongly wavelength dependent, could achromatize integrated optics, waveguide lenses. One such bulk optics achromatization technique involves the use of diffractive elements such as Fresnel zone lenses. See A. I. Tudorovskii, "An Objective with a Phase Plate," Optics and Spectroscopy, Volume 6, No. 2, February 1959, page 126; K. Miyamoto, "The Phase Fresnel Lens," Journal of the Optical Society of America, Volume 51, No. 1, January 1961, page 17, Madjidi-Zolbanine and C. Froehly, "Holographic Correction of Both Chromatic and Spherical Aberrations of Single Glass Lenses," Applied Optics, Volume 18, No. 14, July 15, 1979, page 2385; G. M. Morris, "Diffraction Theory for an Achromatic Fourier Transformation," Applied Optics, Volume 20, page 2017, June 1, 1981; P. Stone and N. George, "Hybrid Diffractive-Refractive Lenses and Achromats," Applied Optics, Volume 27, No. 14, July 15, 1988, page 2960. Moreover even achromatic, refractive, singlet mode-index lenses made by selecting the discrete $N_L$ and $N_B$ values for achromatizing the singlet have not been found suitable for practical application because of the constraint on the integrated optic design to work with only certain pairs of thicknesses. If the difference in thickness is large, scattering and inefficiency adversely effects performance of the lens and the integrated optical circuit in which it is disposed. In addition, achromatic mode-index singlets cannot, in general, be made for lenses formed with techniques such as ion-implantation or proton-exchange.

It has been found in accordance with the invention that any mode-index lens having any effective mode-index can be achromatized by using a diffractive element, and in one, embodiment of the invention, by providing a refractive/diffractive doublet of desired power in total. The power of the refractive and diffractive elements of the lens are chosen to make the derivative of the focal length with wavelength zero at the design wavelength. By using the derivative of the focal length as the design criteria for achromatizing the lens, a wide range of optical powers and focal lengths can be obtained. Also aberrations in the diffractive lens can be counteracted by designing the diffractive lens in accordance with recent diffractive lens design techniques as described in the following articles: D. A. Buralli and G. M. Morris, "Optical Performance of Holographic Kinoforms," Applied Optics, Volume 28, No. 5, Mar. 1, 1989, page 976 and D. Buralli and G. M. Morris, "Design of a Wide Field Diffractive Landscape Lens," Applied Optics, Volume 28, No. 18, Sept. 15, 1989, page 3950. Reference may also be had to the text by H. Nishihara, M. Haruna and T. Suhara, "Optical Integrated Circuits," referenced above for a discussion of both mode-index and refractive (grating type) waveguide lenses (See Chapter 9 of the text).

The present invention has as its feature providing a hybrid mode-index/diffractive waveguide lens that quite unexpectedly has a achromatic response over a broad wavelength interval around the design wavelength ($\lambda_0$) thereof.

Accordingly, it is the principal object of the present invention to provide improved achromatized waveguide lenses suitable for use in integrated optical devices and integrated optical circuits and to methods of achromatizing waveguide lenses.

It is another object of the present invention to provide an improved mode-index waveguide lens.

It is a still further object of the present invention to provide an improved refractive/diffractive achromat.

It is a still further object of the present invention to provide improved achromatic waveguide lenses of which may be manufactured by various techniques for making mode-index lenses such as changing the thickness of the waveguide layer of the lens, applying an overlay waveguide layer, changing the index of the waveguide layer using ion-diffusion or ion-exchange techniques, and wherein the thickness and difference in effective mode-index does not introduce significant scattering and inefficiency at the boundary of the layers.

It is the still further object of the present invention to provide an achromatic waveguide lens which has refractive and diffractive elements and may be made by techniques known in the art to provide waveguide kinoform lens (also known as blazed Fresnel-zone lenses).

Briefly described, the invention may be applied in an integrated optical circuit having an optical waveguide with a substrate layer and a waveguide layer through which light propagates. The layers have different refractive indices. A mode-index lens having first and second surfaces spaced in the direction of light propagation is provided in the waveguide layer. At least one of the mode-index lens surfaces has a curvature. A diffractive mode-index lens having a Fresnel-zone structure is located in the waveguide layer and defines with the mode-index lens a hybrid mode-index/diffractive achromat, the focal length of which is generally invariant with the wavelength of the light over a given range about a design wavelength $\lambda_0$. Preferably the diffractive lens is disposed in and provides the second surface (opposite to the curved surface of the refractive mode-index lens). The hybrid lens is designed so that the derivative of the focal length thereof is zero at the design wavelength.

The foregoing and other objects features and advantages of the invention as well as a presently preferred embodiment thereof and the best mode known for carrying out the invention will become more apparent from a reading of the following description in connection with the accompanying drawings in which.

Figure 1:
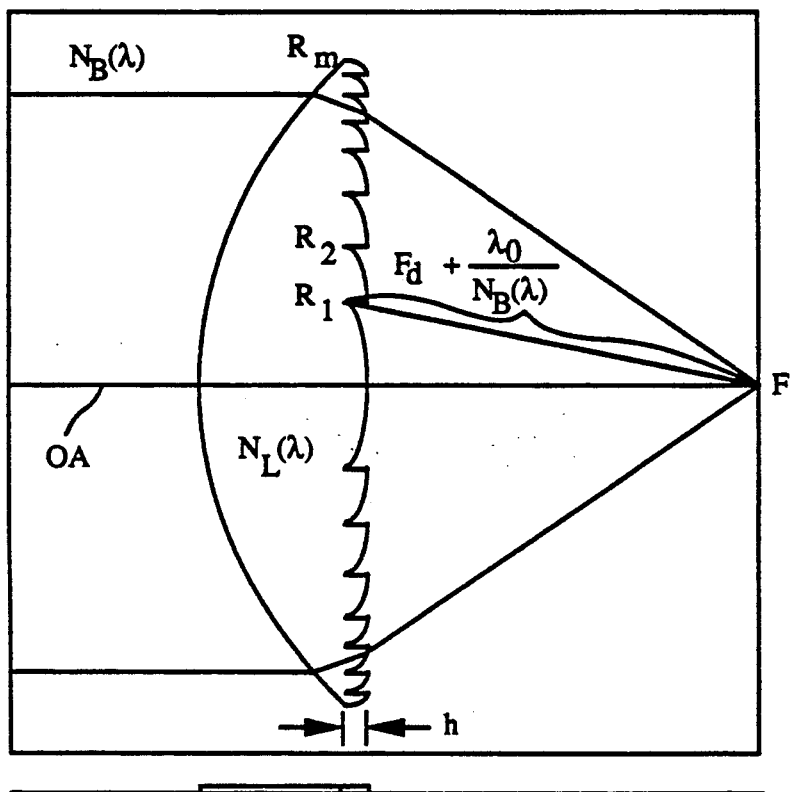
FIG. 1 is a top view of a hybrid mode-index/diffractive achromatic waveguide lens in accordance with the invention.
Figure 1A:
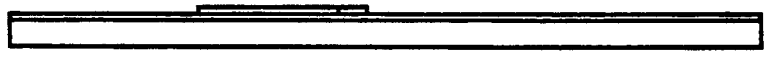
FIG. 1A is a side view of the lens showing the thickness of the background or substrate layer and the step in the waveguide layer providing the mode-index refractive and diffractive components of the achromatic waveguide lens.
Figure 3:
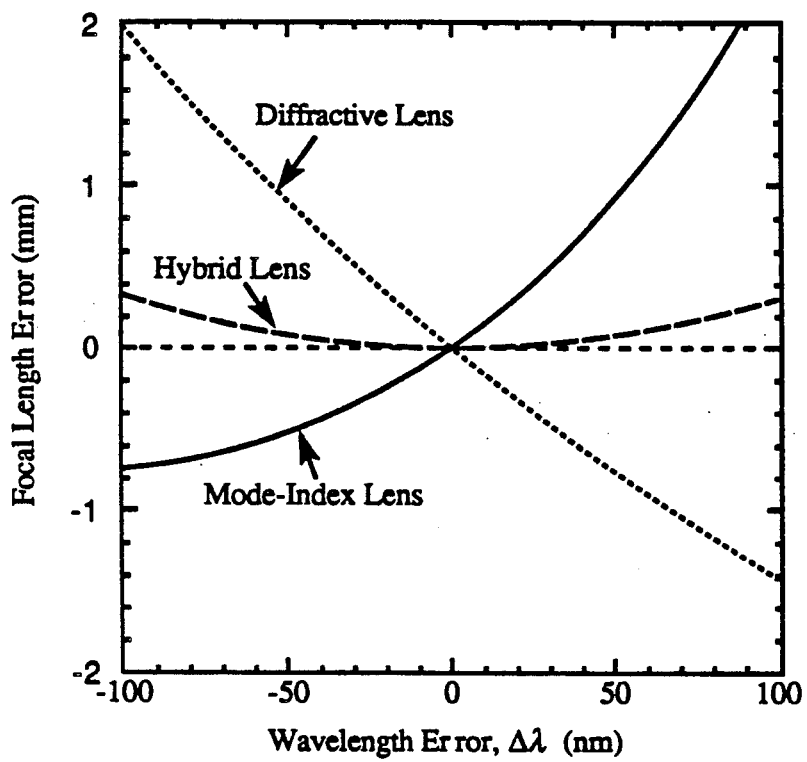
Figure 4:
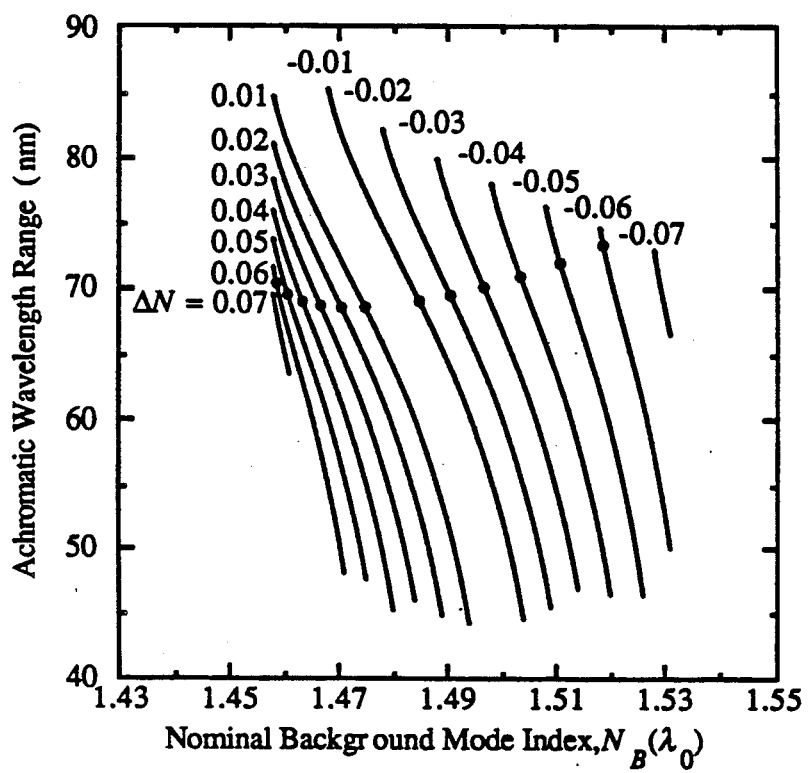

FIG. 3 is a plot showing the comparison of longitudinal chromatic aberration (wavelength-dependent focal length errors) for conventional mode-index and diffractive lenses and a hybrid mode index/diffractive lens achromat of the type shown in FIGS. 1 and 1A; the plot being for a 0.5 um layer of Corning #7059 glass on an oxidized silicon substrate giving a TEO mode-index of 1.484 at $\lambda_0$ equal to 0.6328 um, the mode-index lens elements being formed by reducing the thickness to 0.3 um to give a mode-index difference, $\Delta N$ ($\lambda_0$), of $-0.024$, (the diffractive "Fresnel" lens being shown by the dotted line plot, the refractive mode-index lens being shown by the solid line plot, and the hybrid lens shown by the dashed line plot), the lenses in this example being F/5 and having a nominal focal length of 10 mm;

FIG. 4 is a plot showing the achromatic wavelength range of the hybrid mode-index/diffractive achromatic waveguide lenses as a function of the background mode-index for a series of different $\Delta N$ values; the same waveguide materials and wavelengths as discussed in connection with FIG. 3 being illustrated in the plots.

Consider first and to first order that the optical power of a thin mode-index waveguide lens $\Phi_{mi}$ is proportional to the difference in effective index of refraction between the lens region and background or substrate region of the waveguide.

$$\Phi_{mi}(\lambda) = C[N_L(\lambda) - N_B(\lambda)], \quad (1)$$

where $N_L$ and $N_B$ are the effective mode indices of the lens and background regions (both being a function of wavelength), and C is a constant of proportionality related to the shape of the lens boundaries. The wavelength dependence of the effective mode indices can either be determined analytically from the material and waveguide parameters, or can be measured experimentally for a desired waveguide configuration.

Figure 2:
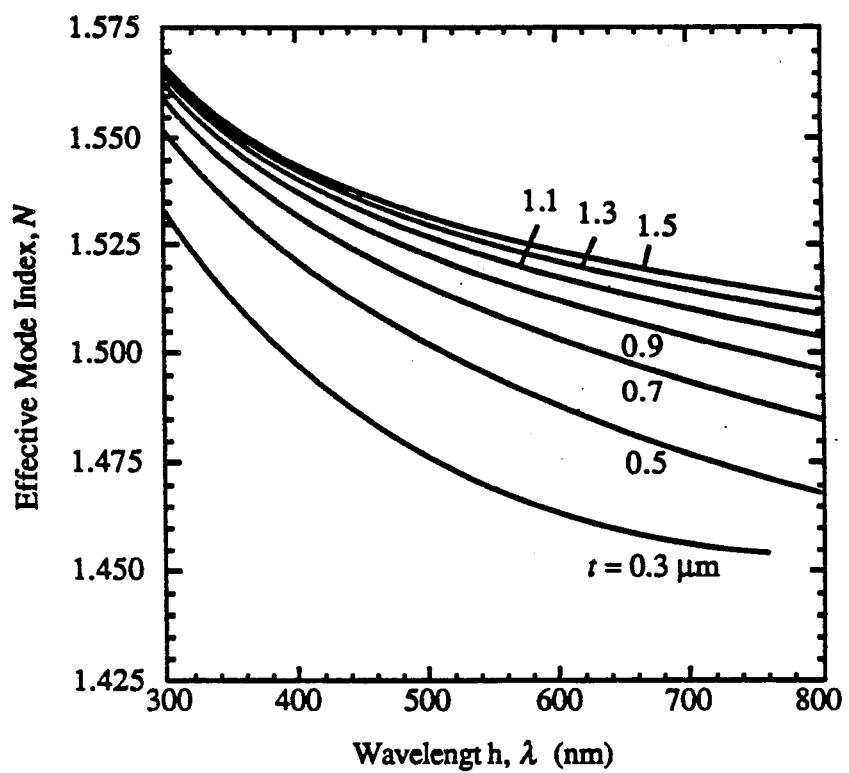
FIG. 2 is a plot of the effective mode-index for the TEO mode as a function of wavelength for a step-index waveguide lens of various thicknesses made with a Corning #7059 waveguide layer on an oxidized silicon substrate.

For a step-index waveguide, the mode-index as a function of wavelength is shown in FIG. 2 for different thicknesses of a typical waveguide material. The curves were made by solving the transcendental mode-index equation (See the Nishihara et al. text cited above at pages 11-15) for the mode-index at each thickness and wavelength. From FIG. 2, it is apparent that both the effective mode-index and the index dispersion (related to the slope of the curve) is a function of the waveguide thickness. The corresponding focal length of the mode-index lens, $F_{mi}$, is given by $$F_{mi}(\lambda) = \frac{N_B(\lambda)}{\Phi_{mi}(\lambda)} = \frac{N_B(\lambda)}{C[N_L(\lambda) - N_B(\lambda)]} . \quad (2)$$

The chromatic dispersion of a lens can be defined as derivative of the focal length with respect to wavelength. This will give an indication of the magnitude of the chromatic variation of the neighborhood of the nominal, or design wavelength ($\lambda_0$). Differentiating Eq. (2) with respect to wavelength gives $$\frac{dF_{mi}(\lambda)}{d\lambda} = \frac{\Delta N(\lambda) \frac{dN_B(\lambda)}{d\lambda} - \Delta\left(\frac{dN(\lambda)}{d\lambda}\right) N_B(\lambda)}{C\Delta N(\lambda)^2} ; \quad (3)$$

where $$\Delta N(\lambda) \equiv N_L(\lambda) \cdot N_B(\lambda), \quad (4)$$

and $$\Delta\left(\frac{dN(\lambda)}{d\lambda}\right) \equiv \frac{dN_L(\lambda)}{d\lambda} - \frac{dN_B(\lambda)}{d\lambda} . \quad (5)$$

From Eq. (3) it can be seen that, in general, the derivative of the focal length will be non-zero, and therefore the lens will be dispersive.

For waveguide optical systems, it is desirable for the derivative of the focal length with respect to wavelength to be zero at the design wavelength. This is defined as the achromatic lens condition. If this condition is met, then the focal length can be essentially a constant in some interval around the nominal ($\lambda_0$) wavelength. Setting Eq. (3) equal to zero, and solving results in a condition that will give an achromatic mode-index lens:

$$\frac{1}{N_L(\lambda_0)} \frac{dN_L(\lambda_0)}{d\lambda} = \frac{1}{N_B(\lambda_0)} \frac{dN_B(\lambda_0)}{d\lambda} . \quad (6)$$

From Eq. (6), it can be seen that an achromatic mode-index lens will result if the relative index dispersion (the ratio of the mode-index derivative over the nominal mode-index value) of the lens and background regions are the same. This is the special case noted by R. Ulrich, et al. in Applied Optics, volume 10, No. 9, 1971 (referenced above). It may not be possible to design a mode-index lens that will satisfy this condition, depending on the waveguide material index characteristics, and the waveguide fabrication process.

Consider next, diffractive lenses. In this connection, although a blazed Fresnel lens is shown in FIG. 1, a chirped grating lenses is also useful in carrying out and providing achromatic lenses in accordance with the invention. Diffractive lenses have a strong wavelength dependence of their optical power. As with conventional diffractive lenses, the optical power will be proportional to the wavelength of the light:

$$\Phi_d(\lambda) = \left(\frac{\lambda}{\lambda_0}\right)\Phi_{d0}, \tag{7}$$

where $\Phi_{d0}$ is the power at the design wavelength, $\lambda_0$. The focal length, $F_d$, will therefore be given by $$F_d(\lambda) = \frac{N_B(\lambda)}{\Phi_d(\lambda)} = \frac{\lambda_0}{\lambda} \frac{N_B(\lambda)}{N_{B0}} F_{d0}, \tag{8}$$

where $N_{B0}=N_B(\lambda_0)$, and $F_{d0}=N_{B0}/\Phi_{d0}$. The chromatic dispersion is found by taking the derivative of the focal length.

$$\frac{dF_d(\lambda)}{d\lambda} = \frac{\lambda_0 F_{d0}}{N_{B0}} \frac{\lambda \frac{dN_B(\lambda)}{d\lambda} - N_B(\lambda)}{\lambda^2}. \tag{9}$$

Evaluating Eq. (9) at the design wavelength $$\frac{dF_d(\lambda_0)}{d\lambda} = \frac{F_{d0}}{N_{B0}} \left(\frac{dN_B(\lambda_0)}{d\lambda} - \frac{N_B(\lambda_0)}{\lambda_0}\right). \tag{10}$$

From this equation (10), it can be seen that the dispersion of a diffractive lens is proportional to the nominal focal length of the lens, and the constant of proportionality is a function of the waveguide material parameters. If a diffractive lens is to satisfy the achromatic lens condition $dF_d(\lambda)/d\lambda$ in Eq. (10) must equal zero. Then, $$\frac{dN_B(\lambda_0)}{d\lambda} = \frac{N_B(\lambda_0)}{\lambda_0}. \tag{11}$$

The dispersion of the mode-index that is required to satisfy this equation (11) would be positive, but the derivative of the index will be negative in a real waveguide, as it demonstrated in FIG. 2. Therefore, it is not possible to make an achromatic diffractive waveguide lens.

Both the mode-index and diffractive types of waveguide lenses are practical to make with planar waveguide technology, and are therefore desirable from a manufacturing standpoint. However, as we have seen, they both, in general, suffer from chromatic aberrations. In the special cases noted above, achromatic mode-index lenses can be made, albeit that such special lenses may be commercially impractical.

In accordance with the invention, an achromatic diffractive/refractive waveguide lens is provided which is designed so that the derivative of the lens focal length is zero at the design wavelenth—this is the achromatic lens condition defined above. Meeting this condition will insure that the chromatic dispersion of the diffractive/refractive mode-index waveguide lens (a doublet) is minimized in the wavelength interval around the design wavelength.

To illustrate the invention, consider a doublet made of a mode-index lens and a diffractive lens. Although the doublet could be made with two separate elements. It is desirable that they be combined into a single hybrid component with the diffractive lens formed as a blazed Fresnel zone structure in the second surface of the refractive lens as shown in FIGS. 1 and 1A. Since there are only two boundaries where scattering will occur, scattering is minimized, efficiency is not derogated and the insertion loss is not significantly greater than either a single mode-index or diffractive lens. The total power, $\Phi_T$, of the doublet will be approximately equal to the sum of the powers for each element if the thickness is small:

$$\Phi_T(\lambda)=\Phi_{mi}(\lambda)+\Phi_t(\lambda) \tag{12}$$

Substituting from Eq (1), (4) and (7), we find that:

$$\Phi_T(\lambda) = C\Delta N(\lambda) + \left(\frac{\lambda}{\lambda_0}\right)\Phi_{d0}. \tag{13}$$

The focal length of the doublet is therefore given by $$F_T(\lambda) = \frac{N_B(\lambda)}{\Phi_T(\lambda)} = \frac{N_B(\lambda)}{C\Delta N(\lambda) + \left(\frac{\lambda}{\lambda_0}\right)\Phi_{d0}}. \tag{14}$$

The derivative of this equation with respect to wavelength provides the expression for the chromatic dispersion which is:

$$\frac{dF_T(\lambda)}{d\lambda} = \frac{\left[C\Delta N(\lambda) + \left(\frac{\lambda}{\lambda_0}\right)\Phi_{d0}\right]\frac{dN_B(\lambda)}{d\lambda} - \left[C\Delta\left(\frac{dN(\lambda)}{d\lambda}\right) + \frac{\Phi_{d0}}{\lambda_0}\right]N_B(\lambda)}{\left[C\Delta N(\lambda) + \left(\frac{\lambda}{\lambda_0}\right)\Phi_{d0}\right]^2}. \tag{15}$$

To satisfy the achromatic lens condition $dF_T(\lambda)/d)(\lambda$, in Eq. (15) is set equal to zero when $\lambda=\lambda_0$, which gives $$[C\Delta N(\lambda_0) + \Phi_{d0}]\frac{dN_B(\lambda_0)}{d\lambda} - \left[C\Delta\left(\frac{dN(\lambda_0)}{d\lambda}\right) + \frac{\Phi_{d0}}{\lambda_0}\right]N_B(\lambda_0) = 0. \tag{16}$$

Likewise, evaluating Eq. (13) at $\lambda=\lambda_0$ gives the nominal total power:

$$\Phi_{T0}=\Phi_T(\lambda)=C\ \Delta N(\lambda)+\Phi_{d0}. \tag{17}$$

Solving Eqs. (16) and (17) for C and $\Phi_{d0}$, gives the nominal powers of the mode-index and diffractive lenses that will produce an achromatic doublet with the desired total power:

$$\Phi_{m0} = C\Delta N(\lambda_0) = \tag{18}$$

$$\Phi_{T0} \frac{\Delta N(\lambda_0)}{N_B(\lambda_0)} \left[ \frac{\frac{dN_B(\lambda_0)}{d\lambda} - \frac{N_B(\lambda_0)}{\lambda_0}}{\Delta\left(\frac{dN(\lambda_0)}{d\lambda}\right) - \frac{\Delta N(\lambda_0)}{\lambda_0}} \right].$$

$$\Phi_{d0} = \tag{19}$$

$$\frac{\Phi_{T0}}{N_B(\lambda_0)} \left[ \frac{N_B(\lambda_0)\Delta\left(\frac{dN(\lambda_0)}{d\lambda}\right) - \frac{dN_B(\lambda_0)}{d\lambda}\Delta N(\lambda_0)}{\Delta\left(\frac{dN(\lambda_0)}{d\lambda}\right) - \frac{\Delta N(\lambda_0)}{\lambda_0}} \right].$$

An achromatic waveguide lens can therefore be designed for a system with arbitrary dispersion characteristics for the waveguide and lens regions.

The special characteristics of this achromatic lens design are illustrated in FIG. 3. The longitudinal chromatic aberration of hybrid mode-index/diffractive waveguide lens is compared with that of the conventional lens types for typical waveguide materials (Corning #7059 glass on an oxidized silicon substrate). The lenses, in each case, were designed to have a focal length of 10 mm and an F/# of 5. The nominal powers of the mode-index and diffractive elements for the achromatic doublet were found using Eqs. (18) and (19), giving focal lengths of $F_d(\lambda_0)=18.4$ mm and $F_d(\lambda_0)=21.9$ mm, respectively. The chromatic dependence of the focal lengths of the different lens was calculated using Eqs. (2), (8) and (14). It can be observed that not only is the focal length of the achromatic doublet essentially a constant over small wavelength errors as expected, but the total focal length error is much smaller than that of the mode-index and diffractive singlets over the entire range of wavelength errors considered.

For certain applications, such as those which use multiple wavelengths of light, the more conventional definition of an achromatic lens may be more appropriate. For this case, we want to have the focal length of the lens be equivalent at two different wavelengths, say $\lambda_1$ and $\lambda_2$. Substituting these wavelengths into Eq. (14) and defining the desired focal length to be $F_{T0}$, we get the following equations:

$$F_T(\lambda_1) = F_{T0} = \frac{N_B(\lambda_1)}{C_2 \Delta N(\lambda_1) + \left(\frac{\lambda_1}{\lambda_0}\right)\Phi_{d0.2}}, \tag{20}$$

$$F_T(\lambda_2) = F_{T0} = \frac{N_B(\lambda_2)}{C_2 \Delta N(\lambda_2) + \left(\frac{\lambda_2}{\lambda_0}\right)\Phi_{d0.2}}. \tag{21}$$

In these equations, the subscript, 2, on the mode-index constant and the nominal diffractive lens power indicate that they correspond to this second type of achromatic lens condition. Solving these two equations for the nominal power of the refractive and diffractive components yields the desired achromatic condition:

$$\Phi_{m0.2} = C_2 \Delta N(\lambda_0) = \frac{\Delta N(\lambda_0)}{F_{T0}} \left[ \frac{\lambda_2 N_B(\lambda_1) - \lambda_1 N_B(\lambda_2)}{\lambda_2 \Delta N(\lambda_1) - \lambda_1 \Delta N(\lambda_2)} \right], \tag{22}$$

$$\Phi_{d0.2} = \frac{\lambda_0}{F_{T0}} \left[ \frac{N_B(\lambda_2)N_L(\lambda_1) - N_B(\lambda_1)N_L(\lambda_2)}{\lambda_2 \Delta N(\lambda_1) - \lambda_1 \Delta N(\lambda_2)} \right]. \tag{23}$$

Note that the nominal powers given by Eqs. (22) and (23) are specified at some wavelength, $\lambda_0$, which may or may not be taken to be one of the two design wavelengths, $\lambda_1$ and $\lambda_2$. This result may be useful for some specific cases, but in general when a small range of wavelengths is being considered, the first solution (Eqs. 18 & 19) obtained should be the more useful.

For a given waveguide configuration, the achromatic wavelength range will be fixed since it is a function only of the mode-index dispersion of the background and lens regions, and the focal length and F/# of the lens. For some waveguide fabrication techniques, such as titanium-indiffused proton-exchanged lenses on a LiNbO$_3$ substrate, there will be only a small amount of freedom to control the mode-index dispersions However, for lenses made with thickness-type fabrication techniques the dispersion will be strongly dependent on the thicknesses which are used. Factors which influence the achromatic wavelength range of the lens are discussed below. For given waveguide materials, there are two degrees of freedom namely, the thicknesses of the background and lens regions. These will accordingly determine the background effective mode-index and the $\Delta N$ value associated with the lens, as well as the dispersion of the two regions.

Curves illustrating the relationship between the achromatic wavelengths range and these two parameters are shown in FIG. 4 for common waveguide materials. The range of values plotted on the curves was truncated when the effective F/# of one of the two elements of the hybrid lens went below F/1, and by the cutoff thickness for the guided mode. The solid circles indicate the locus of the points where Eq. (6) is satisfied, and therefore the lens is purely mode-index. Moving to the left along one of the constant $\Delta N$ curves will decrease the power of the mode-index element and increase the power in the diffractive element. Moving to the right will increase the power of the mode-index element, and gives an increasingly negative power to the diffractive element. Therefore in this example, for a given $\Delta N$ it is desirable to use the minimum practical background mode-index, because in addition to increasing the achromatic wavelength range, it will also balance the power in the two elements therefore reducing the curvature of the mode-index lens boundaries. Since only a fraction of the power of the doublet will reside in the diffractive element, the minimum zone spacing required is typically such larger than a single diffractive lens which therefore makes fabrication of that element easier as well.

The design of the diffractive waveguide lens follows the techniques of the Buralli and Morris papers referenced above. The radiuses of the zones are indicated in FIG. 1 as $R_1, R_2, \ldots, R_N$. The height of the zones is h and the focal length is $F_d$. $N_B(\lambda)$ is the background effective index of refraction. At the design wavelength, the distance $R_1$ should correspond to a path length, which is one wavelength longer than on the optical axis (OA) (where the wavelength is measured in the background medium) $\lambda_0/N_B(\lambda_0)$ $$R_1^2 + F^2 = \left[F + \left(\frac{\lambda_0}{N_B(\lambda)}\right)\right]^2 \quad (24)$$

Likewise the nth full period zone is:

$$R_n^2 + F^2 = \left[F + n\left(\frac{\lambda_0}{N_B(\lambda)}\right)\right]^2 \quad (25)$$

Solving for $R_N$:

$$R_N = \sqrt{\frac{2n\lambda_0 F}{N_B(\lambda_0)} + \frac{n^2\lambda_0^2}{N_B(\lambda_0)}} \quad (26)$$

For a diffraction limited kinoform lens this equation can be approximated by:

$$R_n \approx \sqrt{\frac{2n\lambda_0 F}{N_B(\lambda_0)}} \quad (27)$$

The height of the zones (h) is chosen so that the maximum phase delay is $2\pi$:

$$2\pi = \Phi_{max} = \frac{2\pi}{\lambda_0}(N_L(\lambda_0) - N_B(\lambda_0))h_{max} \quad (28)$$

Solving for $h_{max}$:

$$h_{max} = \frac{\lambda_0}{N_L(\lambda_0) - N_B(\lambda_0)} \quad (29)$$

It is desirable to change the zone spacing to correct for aberrations as discussed in the Buralli and Morris articles cited above.

From the foregoing description, it will be apparent that there has been provided improved achromatic waveguide lenses and methods of achromatizing waveguide lenses, particularly of the mode-index type. Variations and modifications in the herein described lenses and their methods of design and fabrication will undoubtedly suggest themselves to those skilled in the art. Accordingly, the foregoing description should be taken as illustrative and not in a limiting sense.

We claim:

1. In an integrated optical circuit having an optical waveguide with a second region and a first region of different refractive index than said second region in which light propagates, a mode-index lens having first and second surfaces spaced in the direction of light propagating in said second region, said first surface having a certain curvature, the improvement comprising a diffractive lens having a Fresnel zone structure which defines with said mode-index lens a hybrid mode-index achromatic lens, the focal length of which is generally invariant with wavelength of the light over a given range about a design wavelength $\lambda_0$.

2. The improvement according to claim 1 wherein said diffractive zone structure is disposed in said second surface of said mode-index lens.

3. The improvement according to claim 1 wherein said Fresnel zone index lens has a blazed Fresnel zone structure.

4. The improvement according to claim 1 wherein said mode-index lens is a refractive lens and wherein said first region is of a thickness or refractive-index which provides said different refractive index which defines an effective mode index.

5. The improvement according to claim 4 wherein said first region has a pattern defining said Fresnel zones.

6. The improvement according to claim 1 wherein the derivative of the focal length of said hybrid lens is zero at the design wavelength.

7. The improvement according to claim 1 wherein the power of said refractive mode-index lens $\theta_{m0}$ and the power of said diffractive lens $\theta_{d0}$ add to provide the total power of said hybrid lens at said design wavelength and satisfy the following equations:

$$\Phi_{m0} = C\Delta N(\lambda_0) =$$

$$\Phi_{T0}\frac{\Delta N(\lambda_0)}{N_B(\lambda_0)}\left[\frac{\frac{dN_B(\lambda_0)}{d\lambda} - \frac{N_B(\lambda_0)}{\lambda_0}}{\Delta\left(\frac{dN(\lambda_0)}{d\lambda}\right) - \frac{\Delta N(\lambda_0)}{\lambda_0}}\right],$$

$$\Phi_{d0} =$$

$$\frac{\Phi_{T0}}{N_B(\lambda_0)}\left[\frac{N_B(\lambda_0)\Delta\left(\frac{dN(\lambda_0)}{d\lambda}\right) - \frac{dN_B(\lambda_0)}{d\lambda}\Delta N(\lambda_0)}{\Delta\left(\frac{dN(\lambda_0)}{d\lambda}\right) - \frac{\Delta N(\lambda_0)}{\lambda_0}}\right].$$

wherein C is the curvature of said first surface, $N_L$ is the effective mode-index of said first region, $N_B$ is the effective mode-index of said second region and $\Delta_N(\lambda) = N_L - N_B$ and:

$$\Delta\left(\frac{dN(\lambda)}{d\lambda}\right) = \frac{dN_L(\lambda)}{d\lambda} - \frac{dN_B(\lambda)}{d\lambda}.$$

8. The method of achromatizing a refractive mode-index waveguide lens which comprises the steps of placing a diffractive mode-index lens in tandem with said refractive lens to provide a doublet with a given focal length in said waveguide, and adjusting the powers of said lens so that the derivatives of the focal length of said refractive/diffractive doublet is zero at at least one wavelength.

9. The method according to claim 8 wherein said wavelength is the design wavelength.

10. The method according to claim 8 wherein said powers are defined by the following equations:

$$\Phi_{m0} = C\Delta N(\lambda_0) =$$

$$\Phi_{T0}\frac{\Delta N(\lambda_0)}{N_B(\lambda_0)}\left[\frac{\frac{dN_B(\lambda_0)}{d\lambda} - \frac{N_B(\lambda_0)}{\lambda_0}}{\Delta\left(\frac{dN(\lambda_0)}{d\lambda}\right) - \frac{\Delta N(\lambda_0)}{\lambda_0}}\right],$$

$$\Phi_{d0} =$$

-continued $$\frac{\Phi_{T0}}{N_B(\lambda_0)} \left[ \frac{N_B(\lambda_0)\Delta\left(\frac{dN(\lambda_0)}{d\lambda}\right) - \frac{dN_B(\lambda_0)}{d\lambda}\Delta N(\lambda_0)}{\Delta\left(\frac{dN(\lambda_0)}{d\lambda}\right) - \frac{\Delta N(\lambda_0)}{\lambda_0}} \right].$$

or the following equations:

$$\Phi_{mi0.2} = C_2 \Delta N(\lambda_0) = \frac{\Delta N(\lambda_0)}{F_{T0}} \left[ \frac{\lambda_2 N_B(\lambda_1) - \lambda_1 N_B(\lambda_2)}{\lambda_2 \Delta N(\lambda_1) - \lambda_1 \Delta N(\lambda_2)} \right],$$

-continued $$\Phi_{d0.2} = \frac{\lambda_0}{F_{T0}} \left[ \frac{N_B(\lambda_2)N_L(\lambda_1) - N_B(\lambda_1)N_L(\lambda_2)}{\lambda_2 \Delta N(\lambda_1) - \lambda_1 \Delta N(\lambda_2)} \right].$$

wherein C is the curvature of a surface of said diffractive lens, $N_L$ is the effective mode-index of a region of said waveguide wherein light propagates, $N_B$ is the effective mode-index of a background region of said waveguide and:

$$\Delta N(\lambda) \equiv N_L(\lambda) - N_B(\lambda),$$

and:

$$\Delta\left(\frac{dN(\lambda)}{d\lambda}\right) \equiv \frac{dN_L(\lambda)}{d\lambda} - \frac{dN_B(\lambda)}{d\lambda}.$$

* * * * *